United States Patent
Turtinen et al.

(10) Patent No.: US 12,507,313 B2
(45) Date of Patent: Dec. 23, 2025

(54) MOBILE TERMINATED SMALL DATA TRANSMISSION BEARER HANDLING

(71) Applicant: Nokia Technologies Oy, Espoo (FI)

(72) Inventors: Samuli Heikki Turtinen, Oulu (FI); Jussi-Pekka Koskinen, Oulu (FI); Chunli Wu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 19/294,425

(22) Filed: Aug. 8, 2025

(65) Prior Publication Data

US 2025/0365806 A1     Nov. 27, 2025

Related U.S. Application Data

(63) Continuation of application No. PCT/CN2023/076963, filed on Feb. 17, 2023.

(51) Int. Cl.
*H04W 76/27* (2018.01)
(52) U.S. Cl.
CPC .................. *H04W 76/27* (2018.02)
(58) Field of Classification Search
None
See application file for complete search history.

(56) References Cited

U.S. PATENT DOCUMENTS

2023/0051568 A1   2/2023   Kim et al.
2024/0155556 A1*  5/2024   Lu ................ H04W 68/005

FOREIGN PATENT DOCUMENTS

CN        115209361 A       10/2022
WO        2022/184402 A1    9/2022

OTHER PUBLICATIONS

"New WI: Mobile Terminated-Small Data Transmission (MT-SDT) for NR", 3GPP TSG RAN Meeting #94e, RP-213583, Agenda Item: 8.6.2, ZTE Corporation, Dec. 6-17, 2021, 5 pages.
"3rd Generation Partnership Project; Technical Specification Group Radio Access Network; NR; Radio Resource Control (RRC) protocol specification (Release 17)", 3GPP TS 38.331 V17.3.0, Dec. 2022, pp. 1-1318.
"3rd Generation Partnership Project; Technical Specification Group Radio Access Network; NR; NR and NG-RAN Overall Description; Stage 2 (Release 17)", 3GPP TS 38.300 V17.3.0, Dec. 2022, pp. 1-210.

(Continued)

*Primary Examiner* — Gary Lafontant
(74) *Attorney, Agent, or Firm* — Nokia Technologies Oy

(57) ABSTRACT

Embodiments of the present disclosure relate to devices, methods, apparatuses and computer readable storage media of bearer handling during Mobile Terminated Small Data Transmission (MT-SDT). The method comprises determining that data not belonging to MT-SDT bearer is available during an MT-SDT procedure or data belonging to a MT-SDT bearer is available during a Mobile Oriented Small Data Transmission (MO-SDT) procedure; and based on the determining, perform at least one of: transmitting an indication of presence of the data to a network device, or resuming the non-MT-SDT bearer during the MT-SDT procedure or the MT-SDT bearer during the MO-SDT procedure, or transmitting data not belonging to MT-SDT bearer after the MT-SDT procedure is completed or data belonging to MT-SDT bearer after the MO-SDT procedure is completed.

20 Claims, 4 Drawing Sheets

(56) References Cited

OTHER PUBLICATIONS

"3rd Generation Partnership Project; Technical Specification Group Radio Access Network; NR; Medium Access Control (MAC) protocol specification (Release 17)", 3GPP TS 38.321 V17.3.0, Dec. 2022, pp. 1-251.

"IEEE 802.11", Wikipedia, Retrieved on Sep. 15, 2025, Webpage available at: https://en.wikipedia.org/wiki/IEEE_802.11.

International Search Report and Written Opinion received for corresponding Patent Cooperation Treaty Application No. PCT/CN2023/076963, dated Apr. 21, 2023, 8 pages.

"Impacts of SDT on NAS", 3GPP TSG CT WG1 Meeting 131-e, C1-214496, Agenda item: 17.1.2, Apple, Aug. 19-27, 2021, 5 pages.

\* cited by examiner

MOBILE TERMINATED SMALL DATA TRANSMISSION BEARER HANDLING

FIELD

Embodiments of the present disclosure generally relate to the field of telecommunication and in particular to devices, methods, apparatuses and computer readable storage media of Mobile Terminated Small Data Transmission (MT-SDT) bearer handling.

BACKGROUND

Small Data Transmission (SDT) is a procedure allowing data and/or signaling transmission while remaining in a Radio Resource Control (RRC) non-connected state, i.e., RRC_INACTIVE state without transitioning to a RRC connected state, i.e., RRC_CONNECTED state.

SUMMARY

In general, example embodiments of the present disclosure provide a solution of MT-SDT bearer handling.

In a first aspect, there is provided an apparatus. The apparatus comprises at least one processor; and at least one memory storing instructions that, when executed by the at least one processor, cause the apparatus at least to determine that data not belonging to MT-SDT bearer is available during an MT-SDT procedure or data belonging to a MT-SDT bearer is available during a Mobile Oriented Small Data Transmission (MO-SDT) procedure; and based on the determining, perform at least one of: transmitting an indication of presence of the data to a network device, or resuming the non-MT-SDT bearer during the MT-SDT procedure or the MT-SDT bearer during the MO-SDT procedure, or transmit data not belonging to MT-SDT bearer after the MT-SDT procedure is completed or data belonging to MT-SDT bearer after the MO-SDT procedure is completed.

In a second aspect, there is provided an apparatus. The apparatus comprises at least one processor; and at least one memory storing instructions that, when executed by the at least one processor, cause the apparatus at least to receive, from a terminal device, at least one of: an indication of presence of data not belonging to a MT-SDT bearer is available during an MT-SDT procedure or data belonging to a MT-SDT bearer is available during a MO-SDT procedure, or data not belonging to MT-SDT bearer after the MT-SDT procedure is completed or data belonging to MT-SDT bearer after the MO-SDT procedure is completed.

In a third aspect, there is provide a method. The method comprises determining, at a terminal device, that data not belonging to MT-SDT bearer is available during an MT-SDT procedure or data belonging to a MT-SDT bearer is available during a MO-SDT procedure; and based on the determining, perform at least one of: transmitting an indication of presence of the data to a network device, or resuming the non-MT-SDT bearer during the MT-SDT procedure or the MT-SDT bearer during the MO-SDT procedure, or transmitting data not belonging to MT-SDT bearer after the MT-SDT procedure is completed or data belonging to MT-SDT bearer after the MO-SDT procedure is completed.

In a fourth aspect, there is provide a method. The method comprises receiving, at a network device and from a terminal device, at least one of: an indication of presence of data not belonging to a MT-SDT bearer is available during an MT-SDT procedure or data belonging to a MT-SDT bearer is available during a MO-SDT procedure, or data not belonging to MT-SDT bearer after the MT-SDT procedure is completed or data belonging to MT-SDT bearer after the MO-SDT procedure is completed.

In a fifth aspect, there is provided an apparatus comprising means for determining that data not belonging to MT-SDT bearer is available during an MT-SDT procedure or data belonging to a MT-SDT bearer is available during a MO-SDT procedure; and based on the determining, perform at least one of: transmitting an indication of presence of the data to a network device, or resuming the non-MT-SDT bearer during the MT-SDT procedure or the MT-SDT bearer during the MO-SDT procedure, or transmitting data not belonging to MT-SDT bearer after the MT-SDT procedure is completed or data belonging to MT-SDT bearer after the MO-SDT procedure is completed.

In a sixth aspect, there is provided an apparatus comprising means for receiving, from a terminal device, at least one of: an indication of presence of data not belonging to a MT-SDT bearer is available during an MT-SDT procedure or data belonging to a MT-SDT bearer is available during a MO-SDT procedure, or data not belonging to MT-SDT bearer after the MT-SDT procedure is completed or data belonging to MT-SDT bearer after the MO-SDT procedure is completed.

In a seven aspect, there is provided a computer readable medium having a computer program stored thereon which, when executed by at least one processor of an apparatus, causes the apparatus to carry out the method according to the third aspect or the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings.

Throughout the drawings, the same or similar reference numerals may represent the same or similar element.

DETAILED DESCRIPTION

Figure 1:
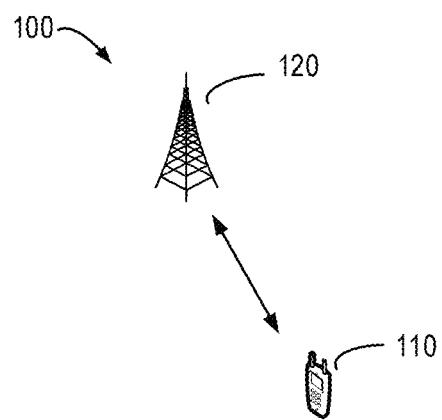
FIG. 1 illustrates an example environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein may be implemented in various manners other than the ones described below.

In the following description and claims, unless defined otherwise, all technical and scientific terms used herein may have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT), an Enhanced Machine type communication (eMTC) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the terms "network device", "radio network device" and/or "radio access network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, low earth orbit (RAN) split architecture includes a Centralized Unit (CU) and a Distributed Unit (DU). In some other example embodiments, part of the radio access network device or full of the radio access network device may embarked on an airborne or space-borne NTN vehicle.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

FIG. 1 shows an example communication network 100 in which embodiments of the present disclosure may be implemented. As shown in FIG. 1, the communication network 100 may include a terminal device 110. Hereinafter the terminal device 110 may also be referred to as a UE.

The communication network 100 may further include a network device 120. Hereinafter the network device 120 may also be referred to as a gNB or an eNB. The terminal device 110 may communicate with the network device 120.

It is to be understood that the number of network devices and terminal devices shown in FIG. 1 is given for the purpose of illustration without suggesting any limitations. The communication network 100 may include any suitable number of network devices and terminal devices.

In some example embodiments, links from the network device 120 to the terminal device 110 may be referred to as a downlink (DL), while links from the terminal device 110 to the network device 120 may be referred to as an uplink (UL). In DL, the network device 120 is a transmitting (TX) device (or a transmitter) and the terminal device 110 is a receiving (RX) device (or receiver). In UL, the terminal device 110 is a TX device (or transmitter) and the network device 120 is a RX device (or a receiver).

Communications in the communication environment 100 may be implemented according to any proper communication protocol(s), includes, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, includes but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

As described above, the SDT procedure may allow data and/or signaling transmission while remaining in an RRC_INACTIVE state.

The SDT may be enabled on a radio bearer basis and initiated by the terminal device only if less than a configured amount of UL data awaits transmission across all radio bearers for which SDT is enabled, the DL Reference Signal Received Power (RSRP) is above a configured threshold, and a valid SDT resource is available. Maximum duration the SDT procedure may depend on a SDT failure detection timer that is configured by the network.

The SDT procedure may be initiated with either a transmission over Random Access Channel (RACH) (configured via system information) or over Type 1 Configured Grant (CG) resources (configured via dedicated signalling in RRCRelease).

While the SDT procedure is ongoing, if data appears in a buffer of any radio bearer not enabled for SDT, the terminal device may initiate a transmission of a non-SDT data arrival indication using UEAssistanceInformation message to the network and, if available, includes the resume cause.

The SDT procedure over CG resources may only be initiated with valid UL timing alignment. The UL timing alignment is maintained by the terminal device based on a SDT-specific timing alignment timer configured by the network via dedicated signalling and, for initial CG-SDT transmission, also by DL RSRP of configured number of highest ranked Synchronization Signal Blocks (SSBs) which are above a configured RSRP threshold.

Furthermore, a work item for MT-SDT has been further discussed and developed. MT-SDT is data that belongs to bearers that are configured for SDT. The network may only trigger MT-SDT if the data belongs to those bearers.

It would be beneficial to allow network to configure different radio bearers for Mobile Oriented SDT (MO-SDT) and MT-SDT, because different resources may be used for MO-SDT and MT-SDT. In addition, MO-SDT and MT-SDT data may have different quality of service requirements. Generally, network may not want to allow the terminal device to initiate MO-SDT for certain Data Radio Bearer (DRB) that configures for MT-SDT. Similarly, it may also not want to allow the terminal device to initiate data transmission on certain MO-SDT bearers while a MT-SDT procedure is ongoing since too much loading for the SDT procedure may be generated in this situation.

However, when the network device configures different radio bearers for MO-SDT and MT-SDT, then the behaviour of the terminal device, in a case where MT-SDT procedure is ongoing and uplink data belonging to MO-SDT bearer becomes available for transmission, may need to be further discussed.

The solution of the present disclosure proposes a mechanism for the bearer handling. In this solution, the terminal device 110 may indicate that data not belonging to MT-SDT bearer is available for transmission during MT-SDT procedure is ongoing or data belonging to MT-SDT bearer is available for transmission during a MO-SDT procedure is ongoing. Or the terminal device 110 may resume a non-MT-SDT bearer during MT-SDT procedure is ongoing or a MO-SDT bearer during a MT-SDT procedure is ongoing.

In this way, the behaviour of terminal device for handling of uplink data not belonging to a MT-SDT bearer (e.g., a MO-SDT bearer) which becomes available for transmission during the MT-SDT procedure may be specified.

Example embodiments of the present disclosure will be described in detail below with reference to the accompanying drawings.

Figure 2:
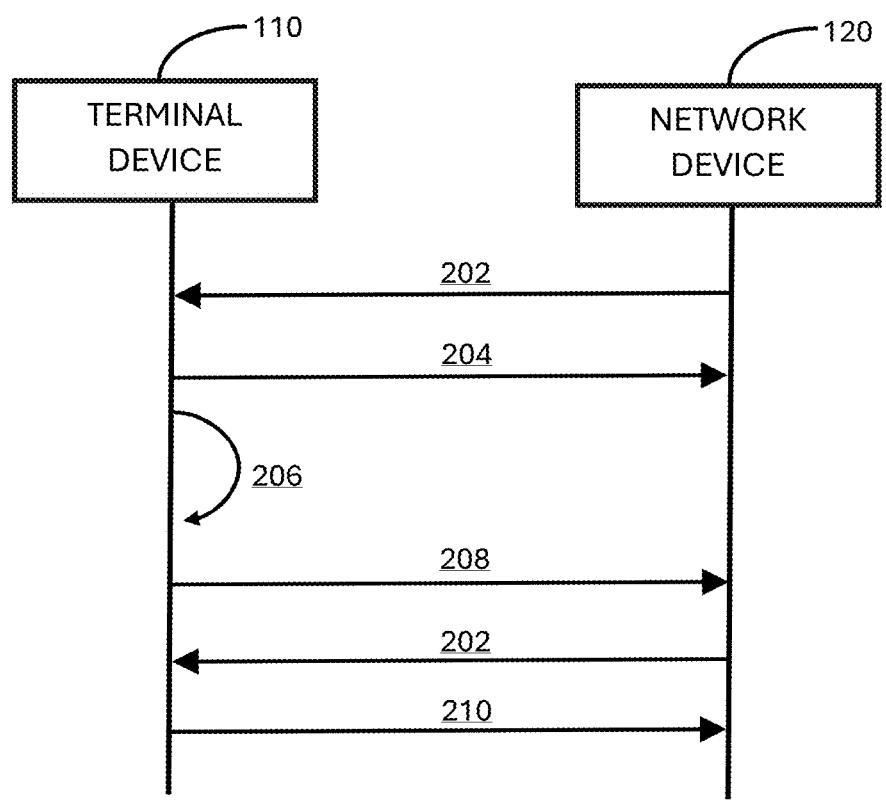
FIG. 2 shows a signaling chart illustrating an example of process according to some example embodiments of the present disclosure.

Reference is now made to FIG. 2, which shows a signaling chart 200 for communication according to some example embodiments of the present disclosure. As shown in FIG. 2, the signaling chart 200 involves the terminal device 110 and the network device 120. For the purpose of discussion, reference is made to FIG. 1 to describe the signaling chart 200.

During a MT-SDT procedure is ongoing, the terminal device 110 may have data not belonging to MT-SDT bearer available for the transmission. Similarly, during a MO-SDT procedure, the terminal device 110 may have data belonging to MT-SDT bearer available for the transmission.

Embodiments of the present disclosure hereinafter may be described with a scenario where data not belonging to MT-SDT bearer is available for the transmission during a MT-SDT procedure is ongoing. It is to be understood that similar mechanisms or solutions may also be applied for the scenario where data belonging to MT-SDT bearer is available for the transmission during a MO-SDT procedure is ongoing.

In a case where data not belonging to MT-SDT bearer is available for the transmission during a MT-SDT procedure is ongoing, the terminal device 110 may indicate (204), to the network device 120, that data not belonging to MT-SDT bearer is available for the transmission. It is to be understood that the non-MT-SDT bearer used hereinafter may comprise MO-SDT bearer.

In a case where data belonging to MT-SDT bearer is available for the transmission during a MO-SDT procedure is ongoing, the terminal device 110 may indicate (204), to the network device 120, that data belonging to MT-SDT bearer is available for the transmission.

Alternatively or optionally, the terminal device 110 may also indicate to the network device 120, that data not belonging to MT-SDT bearer is resumed. As an option, the terminal device 110 may also indicate that data not belonging to MT-SDT bearer is resumed together with the indication of data not belonging to MT-SDT bearer available for the transmission. As another option, the terminal device 110 may also indicate that data not belonging to MT-SDT bearer is resumed and data not belonging to MT-SDT bearer is available for the transmission in a separate indication.

In some example embodiments, the indication that data not belonging to MT-SDT bearer is resumed together and/or the indication of data not belonging to MT-SDT bearer available for the transmission may be included in a Buffer State Report (BSR). In some other example embodiments, the indication that data not belonging to MT-SDT bearer is resumed together and/or the indication of data not belonging to MT-SDT bearer available for the transmission may be included in an RRC signaling, e.g. assistance information message. i.e., "UEAssistanceInformation" message.

In the assistance information message, a new resume cause indicating an arrival of the non-MT-SDT data or the MO-SDT data or MT-SDT may be included. As another option, a new indication may also be introduced to the assistance information message to indicate the non-MT-SDT data or the MO-SDT data or MT-SDT.

Furthermore, in a case where data not belonging to MT-SDT bearer is available for the transmission during a MT-SDT procedure is ongoing, the terminal device 110 may resume (206) that data not belonging to MT-SDT bearer is available for the transmission. More specifically, the terminal device 110 may resume non-MT-SDT bearer or the MO-SDT bearer for which the uplink data is available for transmission.

Moreover, in a case where data belonging to MT-SDT bearer is available for the transmission during a MO-SDT procedure is ongoing, the terminal device 110 may resume (206) that data belonging to MT-SDT bearer is available for the transmission. More specifically, the terminal device 110 may resume MT-SDT bearer for which the uplink data is available for transmission.

In this case, it is to be understood that the indication that data not belonging to MT-SDT bearer is resumed as described above may be transmitted (208) from the terminal device 110 to the network device 120 after the non-MT-SDT bearer or MO-SDT bearer is resumed by the terminal device 120.

In this case, it is to be understood that the indication that data belonging to MT-SDT bearer is resumed as described above may be transmitted (208) from the terminal device 110 to the network device 120 after the MT-SDT bearer is resumed by the terminal device 120.

In some example embodiments, the terminal device 110 then may transmit (210) the data not belonging to MT-SDT bearer or the MO-SDT bearer to the network device 120 even the MT-SDT procedure is ongoing.

In some example embodiments, the terminal device 110 may transmit (210) the data belonging to MT-SDT bearer from the network device 120 even MO-SDT procedure is ongoing.

As another option, it is also possible that the terminal device 110 may transmit (210) the data not belonging to MT-SDT bearer or the MO-SDT bearer to the network device 120 after MT-SDT procedure is completed. For example, whether the MT-SDT procedure is ongoing may depend on a MT-SDT timer (e.g., t319a timer). That is, the MT-SDT procedure is completed when the MT-SDT timer expires.

As another option, it is also possible that the terminal device 110 may transmit (210) the data belonging to MT-SDT bearer from the network device 120 after the MO-SDT procedure is completed.

In some example embodiments, the network device 120 may allow or configure the terminal device 110 to transmit an indication indicating that data belonging to MO-SDT bearer or non-MT-SDT bearer is available for transmission.

Furthermore, the network device 120 may allow or configure the terminal device 110 to resume or transmit data not belonging to the MT-SDT bearer or the MO-SDT bearer during MT-SDT procedure.

Furthermore, the network device 120 may allow or configure the terminal device 110 to resume or transmit data belonging to the MT-SDT bearer during MO-SDT procedure.

The configuration for the terminal device 110 to transmit an indication indicating that data not belonging to MT-SDT bearer is available for transmission or to resume or transmit data not belonging to the MT-SDT bearer or the MO-SDT bearer during MT-SDT procedure may be transmitted (202)

from the network device 120 to the terminal device 110, for example, before or during the MT-SDT procedure.

The configuration for the terminal device 110 to transmit an indication indicating that data belonging to MT-SDT bearer is available for transmission or to resume or transmit data belonging to the MT-SDT bearer during MO SDT procedure may be transmitted (202) from the network device 120 to the terminal device 110, for example, before or during the MO SDT procedure.

It is to be understood that the configuration for the terminal device 110 to resume or transmit data not belonging to the MT-SDT bearer or data belonging to the MO-SDT bearer during MT-SDT procedure may be transmitted from the network device 120 to the terminal device 110 after the network device 120 receives, from the terminal device 110, an indication indicating that data belonging to MO-SDT bearer is available for transmission.

It is to be understood that the configuration for the terminal device 110 to resume or transmit data belonging to the MT-SDT bearer during MO-SDT procedure may be transmitted from the network device 120 to the terminal device 110 after the network device 120 receives, from the terminal device 110, an indication indicating that data belonging to MT-SDT bearer is available for transmission.

For example, the configuration may be transmitted from the network device 120 to the terminal device 110 via a paging message or a RRC signaling.

As another option, the configuration may be transmitted from the network device 120 to the terminal device 110 via a Medium Access Control (MAC) control element (CE).

In a case where the configuration is transmitted via a MAC CE, the MAC CE may comprise a header indicating that one or more configured non-MT SDT, MO-SDT or MT-SDT bearers are to be resumed. Optionally, the MAC CE may indicate respective bearer corresponding to one or more logical channel identifiers to be resumed, i.e., there is a mapping between respective bearers and one or more logical channels. Moreover, a MAC layer of may indicate to a RRC layer to resume the at least one of the non-MT-SDT/MO-SDT/MT-SDT bearers.

In the solution, the bearer(s) configured for non-MT-SDT, MO-SDT and/or MT-SDT may be referred to as Signal Radio Bearers (SRBs) and/or DRBs.

In this way, the behaviour of terminal device for handling of uplink data not belonging to a MT-SDT bearer (e.g., a MO-SDT bearer) which becomes available for transmission during the MT-SDT procedure may be specified.

Figure 3:
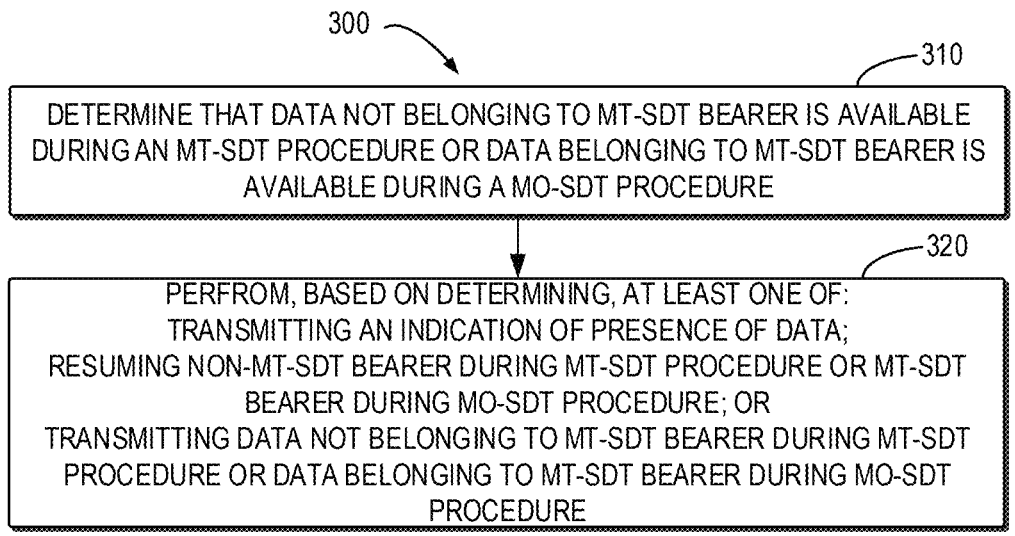
FIG. 3 shows a flowchart of an example method of MT-SDT bearer handling according to some example embodiments of the present disclosure.

FIG. 3 shows a flowchart of an example method 300 of MT-SDT bearer handling according to some example embodiments of the present disclosure. The method 300 may be implemented at the terminal device 110 as shown in FIG. 1. For the purpose of discussion, the method 300 will be described with reference to FIG. 1.

At 310, the terminal device 110 determines data not belonging to a MT-SDT bearer is available for transmission during an MT-SDT procedure or data belonging to a MT-SDT bearer is available for transmission during a MO-SDT procedure.

At 320, based on the determining, the terminal device 110 perform at least one of transmitting, to a network device, an indication that data not belonging to a MT-SDT bearer is available for transmission during an MT-SDT procedure or data belonging to a MT-SDT bearer is available for transmission during a MO-SDT procedure; resuming the non-MT-SDT bearer during the MT-SDT procedure or the MT-SDT bearer during the MO-SDT procedure; or transmitting data not belonging to MT-SDT bearer after the MT-SDT procedure is completed or data belonging to MT-SDT bearer after the MO-SDT procedure is completed.

In some example embodiments, the data not belonging to the MT-SDT bearer further comprises data belonging to MO-SDT.

In some example embodiments, the terminal device may also receive, from the network device, a configuration for the indication or the resuming.

In some example embodiments, the configuration indicates at least one of the following: the apparatus is allowed to transmit the indication, the MO-SDT configured bearers are allowed to be resumed during the MT-SDT procedure, the MT-SDT configured bearers are allowed to be resumed during the MO-SDT procedure, the apparatus is allowed to resume the MO-SDT bearer or transmit data not belonging to the MT-SDT or the MO-SDT bearer during the MT-SDT procedure, the apparatus is allowed to resume MT-SDT bearer or transmit data belonging to the MT-SDT during the MO-SDT procedure.

In some example embodiments, the configuration is received via at least one of the following: a paging message, a MAC CE or a RRC signaling.

In some example embodiments, the configuration indicated by at least one of: the MAC CE comprises a header indicating that one or more configured MO-SDT or MT-SDT bearers are to be resumed; the MAC CE indicates respective bearer corresponding to one or more logical channel identifiers to be resumed.

In some example embodiments, the terminal device may indicate, from a MAC layer to a RRC layer, to resume the at least one of the MO-SDT or MT-SDT bearers.

In some example embodiments, the indication further indicates that MO-SDT bearer or MT-SDT bearer is to be resumed.

In some example embodiments, the indication is included in a BSR or a RRC signaling e.g., an assistance information message.

In some example embodiments, the indication is included in an assistance information message comprises new resume cause for MO-SDT or MT-SDT data arrival, or new indication of MO-SDT or MT-SDT data.

Figure 4:
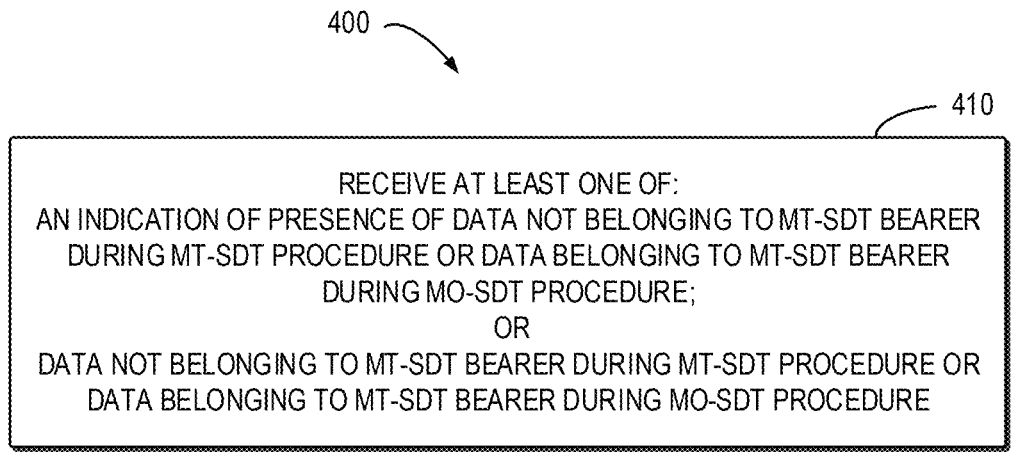
FIG. 4 shows a flowchart of an example method of MT-SDT bearer handling according to some example embodiments of the present disclosure.

FIG. 4 shows a flowchart of an example method 400 of MT-SDT bearer handling according to some example embodiments of the present disclosure. The method 400 may be implemented at the network device 120 as shown in FIG. 1. For the purpose of discussion, the method 400 will be described with reference to FIG. 1.

At 410, the network device 120 receives, from the terminal device 110, at least one of: an indication that that data not belonging to a MT-SDT bearer is available for transmission during an MT-SDT procedure or data belonging to a MT-SDT bearer is available for transmission during a MO-SDT procedure; or data not belonging to MT-SDT bearer after the MT-SDT procedure is completed or data belonging to MT-SDT bearer after the MO-SDT procedure is completed.

In some example embodiments, the data not belonging to the MT-SDT bearer further comprises data belonging to MO-SDT.

In some example embodiments, the network device may also transmit, to the terminal device, a configuration for the indication or the resuming.

In some example embodiments, the configuration indicates at least one of the following: the apparatus is allowed to transmit the indication, the MO-SDT configured bearers are allowed to be resumed during the MT-SDT procedure, the MT-SDT configured bearers are allowed to be resumed during the MO-SDT procedure, the apparatus is allowed to resume the MO-SDT bearer or transmit data not belonging to the MT-SDT or the MO-SDT bearer during the MT-SDT procedure, the apparatus is allowed to resume MT-SDT bearer or transmit data belonging to the MT-SDT during the MO-SDT procedure.

In some example embodiments, the configuration is received via at least one of the following: a paging message, a MAC CE or a RRC signaling.

In some example embodiments, the configuration indicated by at least one of: the MAC CE comprises a header indicating that one or more configured MO-SDT, MT-SDT bearers are to be resumed; the MAC CE indicates respective bearer corresponding to one or more logical channel identifiers to be resumed.

In some example embodiments, the indication further indicates that MO-SDT bearer or MT-SDT bearer is to be resumed.

In some example embodiments, the indication is included in a BSR or a RRC signaling e.g., an assistance information message.

In some example embodiments, the indication is included in an assistance information message comprises new resume cause for MO-SDT or MT-SDT data arrival, or new indication of MO-SDT or MT-SDT data.

In some example embodiments, an apparatus capable of performing the method 300 (for example, implemented at the terminal device 110) may include means for performing the respective steps of the method 300. The means may be implemented in any suitable form. For example, the means may be implemented in a circuitry or software module.

In some example embodiments, the apparatus comprises means for determining that data not belonging to MT-SDT bearer is available during an MT-SDT procedure or data belonging to a MT-SDT bearer is available during a MO-SDT procedure; and based on the determining, perform at least one of: transmitting an indication of presence of the data to a network device, or resuming the non-MT-SDT bearer during the MT-SDT procedure or the MT-SDT bearer during the MO-SDT procedure, or transmitting data not belonging to MT-SDT bearer after the MT-SDT procedure is completed or data belonging to MT-SDT bearer after the MO-SDT procedure is completed.

In some example embodiments, the data not belonging to the MT-SDT bearer further comprises data belonging to MO-SDT.

In some example embodiments, the apparatus may also comprise means for receiving, from the network device, a configuration for the indication or the resuming.

In some example embodiments, the configuration indicates at least one of the following: the apparatus is allowed to transmit the indication, the MO-SDT configured bearers are allowed to be resumed during the MT-SDT procedure, the MT-SDT configured bearers are allowed to be resumed during the MO-SDT procedure, the apparatus is allowed to resume the MO-SDT bearer or transmit data not belonging to the MT-SDT or the MO-SDT bearer during the MT-SDT procedure, the apparatus is allowed to resume MT-SDT bearer or transmit data belonging to the MT-SDT during the MO-SDT procedure.

In some example embodiments, the configuration is received via at least one of the following: a paging message, a MAC CE or a RRC signaling.

In some example embodiments, the configuration indicated by at least one of: the MAC CE comprises a header indicating that one or more configured non-MT SDT, MO-SDT or MT-SDT bearers are to be resumed; the MAC CE indicates respective bearer corresponding to one or more logical channel identifiers to be resumed.

In some example embodiments, the apparatus may also comprise means for indicating, from a MAC layer to a RRC layer, to resume the at least one of the MO-SDT or MT-SDT bearers.

In some example embodiments, the indication further indicates that MO-SDT bearer or MT-SDT bearer is to be resumed.

In some example embodiments, the indication is included in a BSR or a RRC signaling, e.g., an assistance information message.

In some example embodiments, the indication is included in an assistance information message comprises new resume cause for MO-SDT or MT-SDT data arrival, or new indication of MO-SDT or MT-SDT data.

In some example embodiments, an apparatus capable of performing the method 400 (for example, implemented at the network device 120) may include means for performing the respective steps of the method 400. The means may be implemented in any suitable form. For example, the means may be implemented in a circuitry or software module.

In some example embodiments, the apparatus comprises means for receiving, from a terminal device, at least one of: an indication of presence of data not belonging to a MT-SDT bearer is available during an MT-SDT procedure or data belonging to a MT-SDT bearer is available during a MO-SDT procedure, or data not belonging to MT-SDT bearer after the MT-SDT procedure is completed or data belonging to MT-SDT bearer after the MO-SDT procedure is completed.

In some example embodiments, the data not belonging to the MT-SDT bearer further comprises data belonging to MO-SDT.

In some example embodiments, the apparatus may also comprise means for transmitting, to the terminal device, a configuration for the indication or the resuming.

In some example embodiments, the configuration indicates at least one of the following: the apparatus is allowed to transmit the indication, the MO-SDT configured bearers are allowed to be resumed during the MT-SDT procedure, the MT-SDT configured bearers are allowed to be resumed during the MO-SDT procedure, the apparatus is allowed to resume the MO-SDT bearer or transmit data not belonging to the MT-SDT or the MO-SDT bearer during the MT-SDT procedure, the apparatus is allowed to resume MT-SDT bearer or transmit data belonging to the MT-SDT during the MO-SDT procedure.

In some example embodiments, the configuration is received via at least one of the following: a paging message, a MAC CE or a RRC signaling.

In some example embodiments, the configuration indicated by at least one of: the MAC CE comprises a header indicating that one or more configured non-MT SDT, MO-SDT or MT-SDT bearers are to be resumed; the MAC CE indicates respective bearer corresponding to one or more logical channel identifiers to be resumed.

In some example embodiments, the indication further indicates that MO-SDT bearer or MT-SDT bearer is to be resumed.

In some example embodiments, the indication is included in a BSR or a RRC signaling, e.g., an assistance information message.

In some example embodiments, the indication is included in an assistance information message comprises new resume cause for MO-SDT or MT-SDT data arrival, or new indication of MO-SDT or MT-SDT data.

Figure 5:
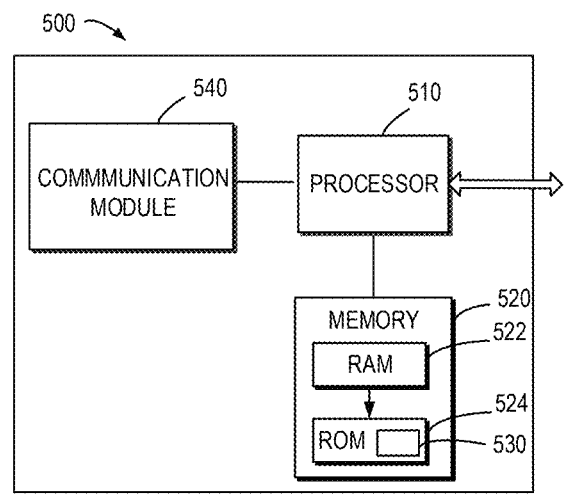
FIG. 5 shows a simplified block diagram of a device that is suitable for implementing example embodiments of the present disclosure.

FIG. 5 is a simplified block diagram of a device 500 that is suitable for implementing example embodiments of the present disclosure. The device 500 may be provided to implement a communication device, for example, the first terminal device 110 or the second terminal device 120 as shown in FIG. 1. As shown, the device 500 includes one or more processors 510, one or more memories 520 coupled to the processor 510, and one or more communication modules 540 coupled to the processor 510.

The communication module 540 is for bidirectional communications. The communication module 540 has one or more communication interfaces to facilitate communication with one or more other modules or devices. The communication interfaces may represent any interface that is necessary for communication with other network elements. In some example embodiments, the communication module 540 may include at least one antenna.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The instructions of the program 530 may include instructions for performing operations/acts of some example embodiments of the present disclosure. The program 530 may be stored in the memory, e.g., the ROM 524. The processor 510 may perform any suitable actions and processing by loading the program 530 into the RAM 522.

The example embodiments of the present disclosure may be implemented by means of the program 530 so that the device 500 may perform any process of the disclosure as discussed with reference to FIG. 2 to FIG. 4. The example embodiments of the present disclosure may also be implemented by hardware or by a combination of software and hardware.

In some example embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 6:
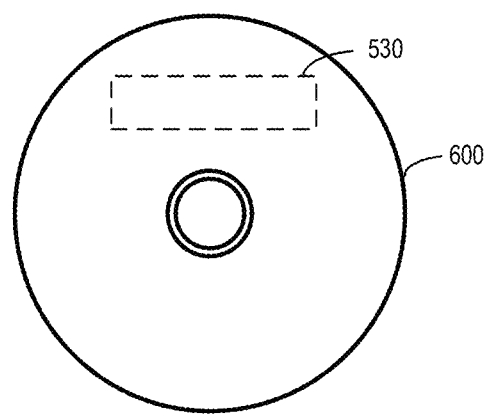
FIG. 6 shows a block diagram of an example computer readable medium in accordance with some embodiments of the present disclosure.

FIG. 6 shows an example of the computer readable medium 600 which may be in form of CD, DVD or other optical storage disk. The computer readable medium 600 has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:
   at least one processor; and
   at least one memory storing instructions that, when executed by the at least one processor, cause the apparatus at least to:
   determine that data not belonging to Mobile Terminated Small Data Transmission, MT-SDT, bearer is available during an MT-SDT procedure or data belonging to a MT-SDT bearer is available during a Mobile Oriented Small Data Transmission, MO-SDT, procedure; and
   based on the determining, perform at least one of:
      transmitting an indication of presence of the data to a network device, or
      resuming the non-MT-SDT bearer during the MT-SDT procedure or the MT-SDT bearer during the MO-SDT procedure, or
      transmitting the data not belonging to MT-SDT bearer after the MT-SDT procedure is completed or the data belonging to MT-SDT bearer after the MO-SDT procedure is completed.

2. The apparatus of claim 1, wherein the data not belonging to the MT-SDT bearer further comprises data belonging to MO-SDT.

3. The apparatus of claim 1, wherein the apparatus is further caused to:
   receive, from the network device, a configuration for the indication or the resuming.

4. The apparatus of claim 3, wherein the configuration indicates at least one of the following:
   the apparatus is allowed to transmit the indication,
   the MO-SDT configured bearers are allowed to be resumed during the MT-SDT procedure,
   the MT-SDT configured bearers are allowed to be resumed during the MO-SDT procedure,
   the apparatus is allowed to resume the MO-SDT bearer or transmit data not belonging to the MT-SDT or the MO-SDT bearer during the MT-SDT procedure,
   the apparatus is allowed to resume MT-SDT bearer or transmit data belonging to the MT-SDT during the MO-SDT procedure.

5. The apparatus of claim 3, wherein the configuration is received via at least one of the following:
   a paging message,
   a medium access control, MAC, control element, CE, or
   a radio resource control signaling.

6. The apparatus of claim 3, wherein the configuration indicated by at least one of:
   the MAC CE comprises a header indicating that one or more configured MO-SDT or MT-SDT bearers are to be resumed; or
   the MAC CE indicates respective bearer corresponding to one or more logical channel identifiers to be resumed.

7. The apparatus of claim 1, the apparatus is further caused to:
   indicate, from a medium access control, MAC, layer of the apparatus to a radio resource control, RRC, layer of the apparatus, to resume the at least one of the MO-SDT or MT-SDT bearers.

8. The apparatus of claim 2, wherein the indication further indicates that
   the MO-SDT bearer or MT-SDT bearer is to be resumed.

9. The apparatus of claim 1, wherein the indication is included in
   a buffer state report, or
   an assistance information message.

10. The apparatus of claim 9, wherein the indication is included in an assistance information message comprises
    new resume cause for MO-SDT or MT-SDT data arrival, or
    new indication of MO-SDT or MT-SDT data.

11. An apparatus comprising:
    at least one processor; and
    at least one memory storing instructions that, when executed by the at least one processor, cause the apparatus at least to:
    receive, from a terminal device, at least one of:
       an indication of presence of data not belonging to a Mobile Terminated Small Data Transmission, MT-SDT, bearer is available during an MT-SDT procedure or data belonging to a MT-SDT bearer is available during a Mobile Oriented Small Data Transmission, MO-SDT, procedure, or
       data not belonging to MT-SDT bearer after the MT-SDT procedure is completed or data belonging to MT-SDT bearer after the MO-SDT procedure is completed.

12. The apparatus of claim 11, wherein the data not belonging to the MT-SDT bearer further comprises data belonging to MO-SDT.

13. The apparatus of claim 11, wherein the apparatus is further caused to:
    transmit, to the terminal device, a configuration for the indication or the data not belonging to the MT-SDT bearer after the MT-SDT procedure is completed or the data belonging to the MT-SDT bearer after the MO-SDT procedure is completed.

14. The apparatus of claim 13, wherein the configuration indicates at least one of the following:
    the apparatus is allowed to transmit the indication,
    the MO-SDT configured bearers are allowed to be resumed during the MT-SDT procedure,
    the MT-SDT configured bearers are allowed to be resumed during the MO-SDT procedure,
    the apparatus is allowed to resume or transmit the data not belonging to the MT-SDT or the MO-SDT during the MT-SDT procedure, or the apparatus is allowed to resume or transmit the data belonging to the MT-SDT during the MO-SDT procedure.

15. The apparatus of claim 13, wherein the configuration is transmitted via at least one of the following:
   a paging message,
   a medium access control, MAC, control element, CE, or
   a radio resource control signaling.

16. The apparatus of claim 15, wherein the configuration indicated by at least one of:
   the MAC CE comprises a header indicating that one or more configured MO-SDT or MT-SDT bearers are to be resumed,
   the MAC CE indicates respective bearer corresponding to one or more logical channel identifiers to be resumed.

17. The apparatus of claim 11, wherein the indication further indicates that
   the MO-SDT bearer or MT-SDT bearer is to be resumed.

18. The apparatus of claim 17, wherein the indication is included in
   a buffer state report, or
   an assistance information message.

19. The apparatus of claim 18, wherein the indication is included in an assistance information message comprises
   new resume cause for MO-SDT or MT-SDT data arrival, or
   new indication of MO-SDT or MT-SDT data.

20. A method comprising:
   determining, at a terminal device, that data not belonging to Mobile Terminated Small Data Transmission, MT-SDT, bearer is available during an MT-SDT procedure or data belonging to a MT-SDT bearer is available during a Mobile Oriented Small Data Transmission, MO-SDT, procedure; and
   based on the determining, performing at least one of:
      transmitting an indication of presence of the data to a network device, or
      resuming the non-MT-SDT bearer during the MT-SDT procedure or the MT-SDT bearer during the MO-SDT procedure, or
      transmitting the data not belonging to MT-SDT bearer after the MT-SDT procedure is completed or the data belonging to MT-SDT bearer after the MO-SDT procedure is completed.

* * * * *